May 30, 1933. J. C. PARSONS 1,912,093
SHOCK ABSORBER
Filed March 1, 1929 3 Sheets-Sheet 3
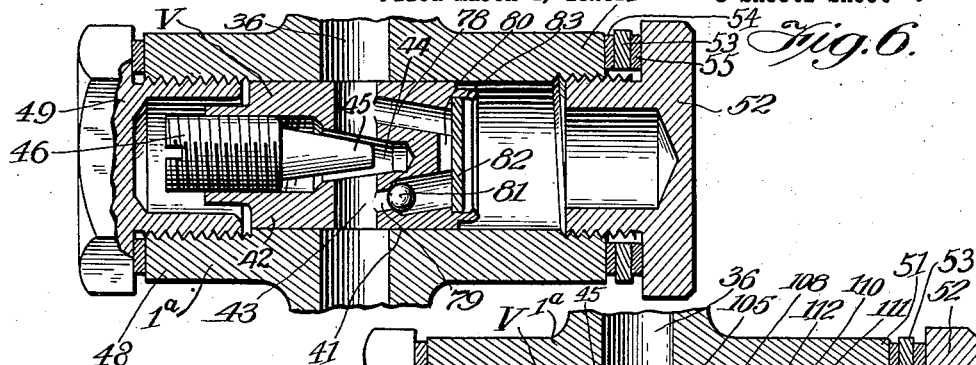
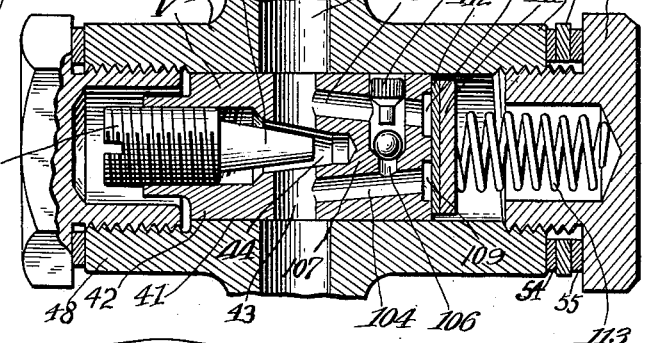
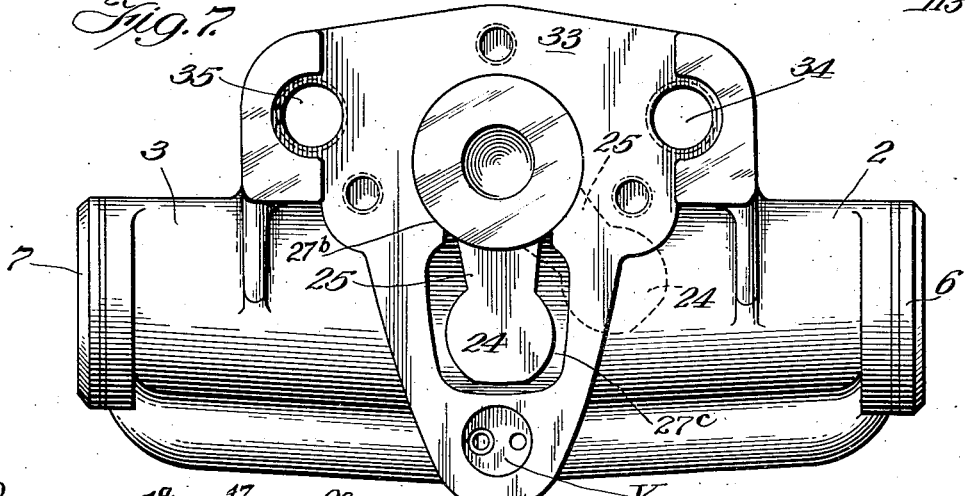
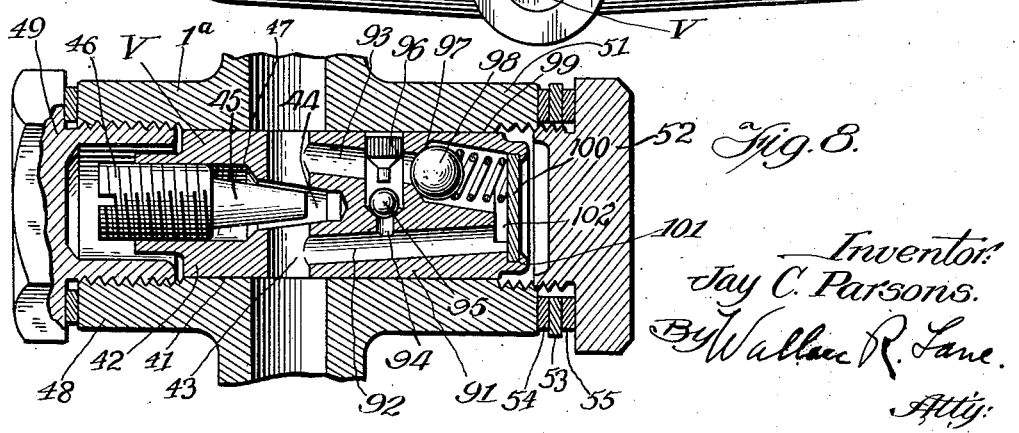
Inventor:
Jay C. Parsons.
By Wallace R. Lane.
Atty.

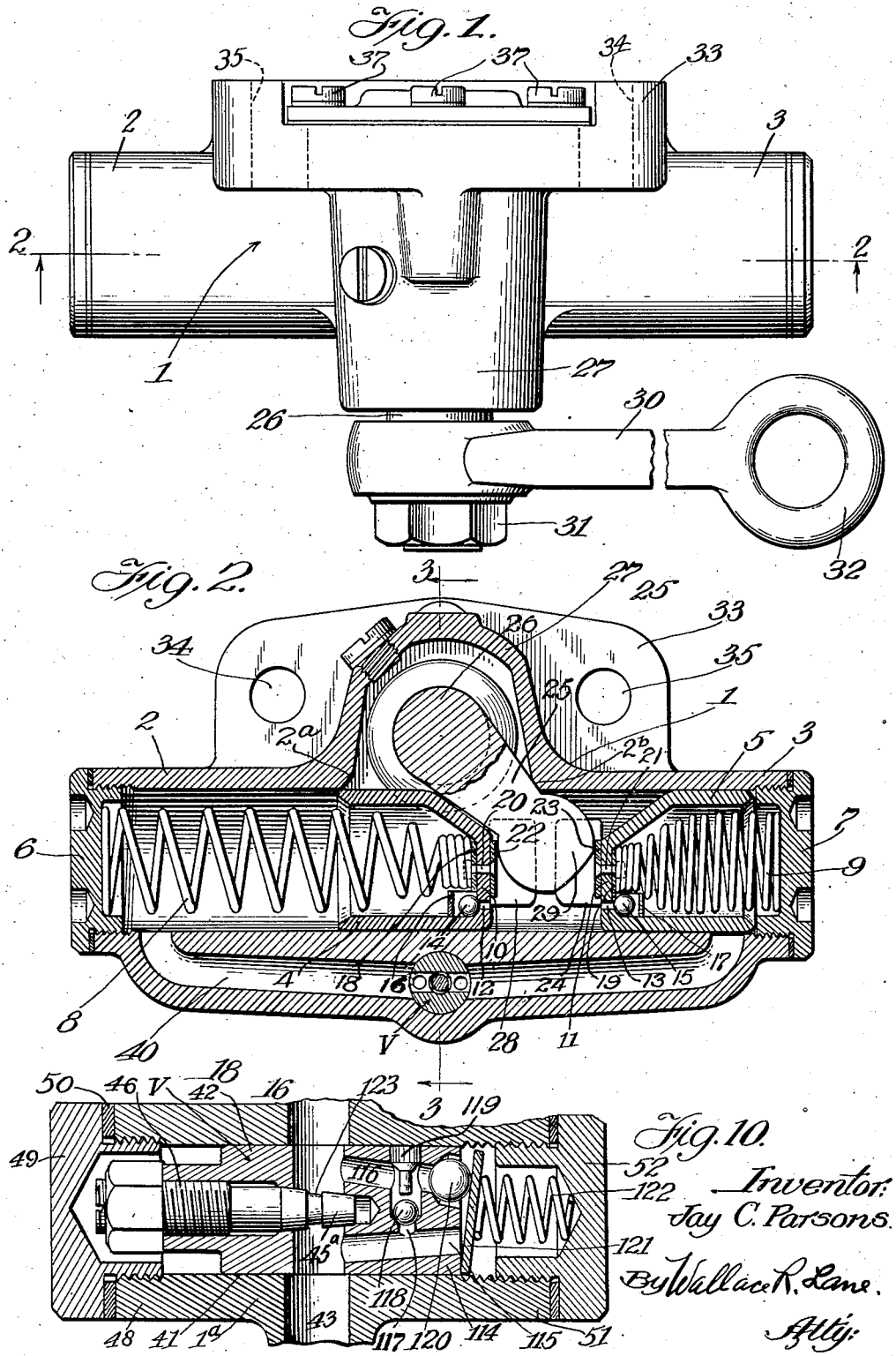

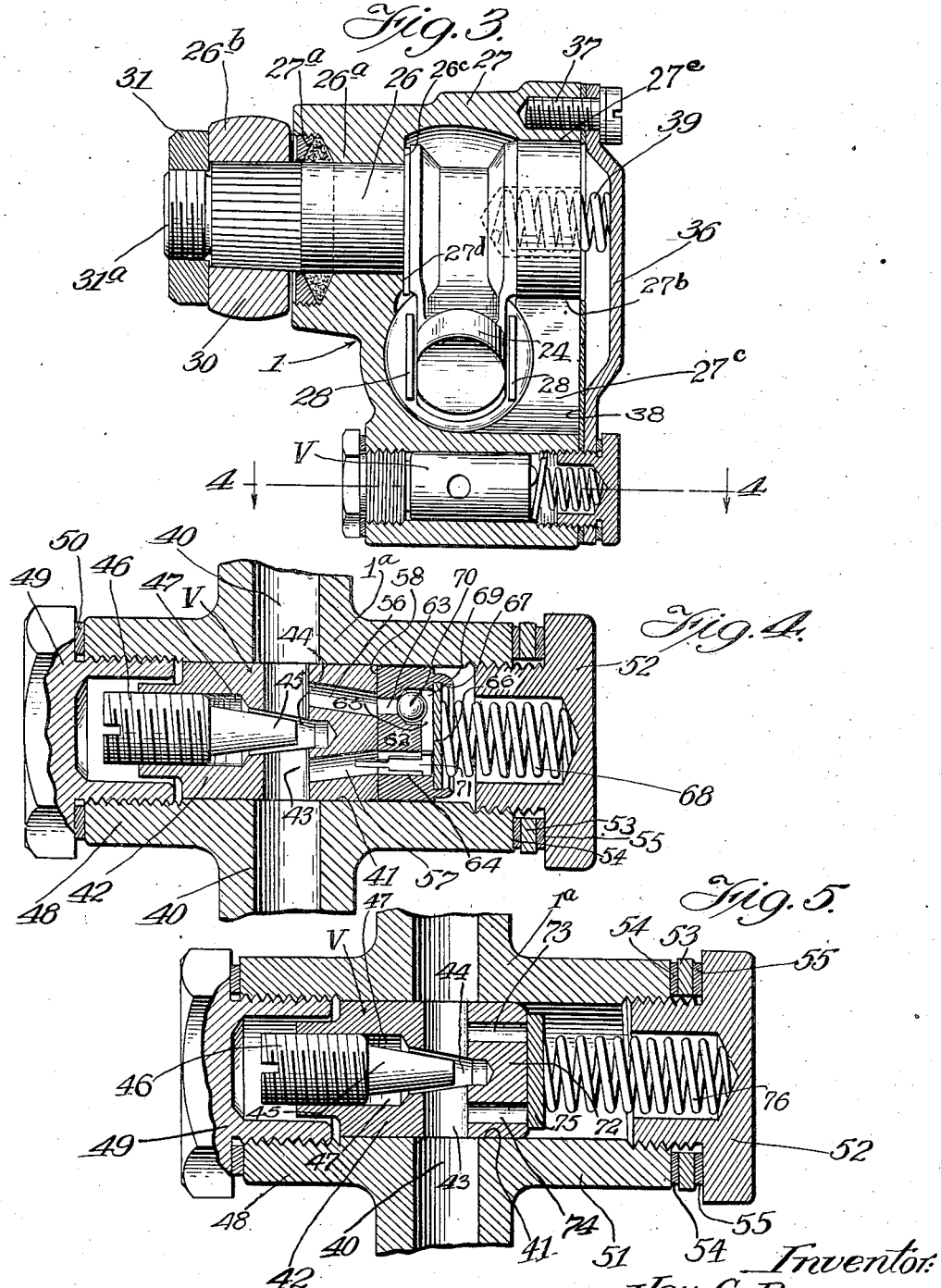

Patented May 30, 1933

1,912,093

UNITED STATES PATENT OFFICE

JAY C. PARSONS, OF CHICAGO, ILLINOIS, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed March 1, 1929. Serial No. 343,607.

The present invention relates to shock absorbers, and the like, such as those used in vehicles, although the same is also adapted for use as door checks and the like.

Among the objects of the invention is to provide a novel shock absorber or the like having a housing for holding a fluid supply, such as oil, and means for causing movement of the fluid from one to another part of the housing, as a piston or pistons moving in a cylinder or cylinders, and novel transfer means adapted to transfer the fluid from one part to another part of the housing, as a duct communicating with the ends of a cylinder or cylinders.

Another object is to provide a novel control means, such as a valve, for imposing a given normal or maximum resistance to transfer or flow of the fluid in the duct of the transfer means, which valve may be adjusted to vary the relative rates of flow or the relative resistances to flow in the opposite directions of flow.

A further object is to provide a novel means for permitting slow or resisted flow in one direction and rapid or free flow in another direction with or without relief means for relieving excessive pressure occurring in the system. Such a means may be in the form of a by-pass with or without checking or throttling means therein, such as ball valves, and with or without means for regulating the opening of the ball valves.

Another object is to provide a device with means, such as springs acting on the pistons and operating arm, to take up wear and lost motion, and to prevent or eliminate loose play, knocking, pounding, and the like.

A further object is to provide a device having means for preventing or eliminating noises, such as hissing and the like. When fluid is forced under pressure through passages usually provided in a shock absorber, hissing is usually present. This is an annoying disadvantage. The present invention avoids hissing by throttling about the ball valve in the by-passage, the annular orifice between the ball and passage being the means for throttling and also for allowing the passage of fluid without hissing, and also by throttling about the plug or needle of the needle valve, the orifice or passage transversely about the needle serving to prevent hissing. The fluid, in both forms of valves, flows as a film and is confined to narrow spaces during its flow through the valves, and has no chance to gurgle about or form high velocity jets, as would be the case if the flow were first in one direction and then in another direction, or about a corner. The flow in the present invention is more in the nature of a diffusion.

Another object is to provide a novel means for supporting the operating arm with balanced bearings so that the force may be imposed in a plane normal to the axis of rotation. The device is designed to permit the assembly of the rock shaft and arm as a unit, preferably through an opening at one side, so that there are bearings at both ends of the rock shaft and in a single solid casting and without resort to split or removable bearings. By such bearings in a single solid or integral structure, there is a more solid front bearing where a great stress is effected. If a plate or split bearing were used here, it would soon become loosened. In the present invention bearings are rigid portions of a single structure.

Other objects, capabilities, advantages and features are comprehended by the invention, as will later appear and as are inherently possessed thereby.

Referring to the drawings, Fig. 1 is a top plan view of an absorber constructed in accordance with the invention;

Fig. 2 is a longitudinal sectional view taken in a plane represented by line 2—2 in Fig. 1 of the drawings;

Fig. 3 is a transverse sectional view taken in a plane represented by line 3—3 in Fig. 2 of the drawings;

Figs. 4, 5, 6, 8, 9, and 10 are longitudinal sectional views of the control mechanism, in alternate forms, taken in a plane represented by line 4—4 in Fig. 3 of the drawings; and Fig. 7 is a side view, with parts removed, of the device.

Referring more in detail to the drawings, the embodiments selected to illustrate the invention are shown as comprising a casing 1 having aligned cylinders 2 and 3 in which axially reciprocate hollow pistons 4 and 5, there being a piston in each cylinder. At the outer ends of the cylinders 2 and 3 are secured closure plates or cylinder heads 6 and 7 which may be screwed to the threaded outer end portions of the cylinders, and have suitable packing, as clearly shown in Fig. 2 of the drawings.

The pistons are hollow and contain helical springs 8 and 9 reacting between cylinder heads 6 and 7 and the inner ends 10 and 11 of the pistons. Normally the springs 8 and 9 tend to push or move the pistons toward each other.

The inner ends 10 and 11 of the pistons are provided with openings or ports 12 and 13 with which cooperate ball valves 14 and 15 located in cages 16 and 17 within the pistons and having flanges 18 and 19 rigidly secured to the inner faces of the piston ends 10 and 11 by any suitable means, such as rivets 20 and 21. In one direction of movement of piston 4 or 5, the ball valve 14 or 15 will close the port 12 or 13, and in an opposite direction of movement of piston 4 or 5, the ball valve 14 or 15 will move back in the cage 16 or 17 and afford passage of the fluid, such as oil or the like, through the port 12 or 13. This structure affords for compensating for leakage that might occur between the pistons and the cylinder walls and preventing creating vacua in the cylinders.

To the outer faces of the piston ends 10 and 11, are also rigidly secured, as by means of the rivets 20 and 21, bearing or thrust plates 22 and 23 with which cooperates a rounded part 24 of a crank arm 25 secured to a transverse shaft 26 extending through extension 27 of the casing 1. The plates 22 and 23 may have side flanges 28 and 29 to act as guides for the rounded part 24, if desired.

The springs 8 and 9 constantly maintain the inner ends of the pistons in contact or in engagement with the head 24 of the arm 25, thus taking up for any wear or lost motion and also eliminating any loose play of parts and the consequent knocking, pounding and the like. These springs also serve as cushioning means at the ends of the throw of the arm 25. As the arm 25 approaches the limits of its throw, the springs become more and more compressed and permit the arm 25 to come to a stop against the abutment surfaces 2ª and 2ᵇ without any knock, pounding or shock.

The shaft is mounted in a bearing 26ª and 27ᵉ formed in the casing. These bearings are preferably integral portions of the casing which is a single unit, thus affording a solid support at both ends of the shaft 26. The arm 24 is preferably made integral with said shaft and extends from an intermediate part of the shaft so that the load on the arm is delivered between the bearings. Bearing 27ᵉ has an opening 27ᵇ in its lower part communicating with an opening 27ᶜ formed in the side wall of the casing below the bearing 27ª. These openings afford a space for the insertion of the shaft 26 (axially) and the arm 24 into the casing, as clearly shown in Figs. 3 and 7. In such a construction split casings, split bearings and split crank arms and divided shafts are wholly eliminated. There is no bolting together of casing halves, or shaft segments. The bearings are permanently aligned and are portions of a single rigid solid unit. The shaft is single and has an integral arm.

The shaft 26 has a portion extending from the bearing 26ª and through packing means 27ª and portion extending through packing means 27 and exteriorly of the casing as shown in Figs. 1 and 3. This exteriorly extending part of the shaft has secured to it a crank arm 30 which may be held rigid with a fluted or grooved part 26ᵇ of the shaft 26 by means of a nut 31 screwed to the threaded end 31ª of the shaft. The other end of the crank arm 30 has an eye 32 to which a suitable connecting link (not shown) may be connected. The casing 1 also has a flange 33 provided with bolt holes 34 and 35 for rigid securement by means of suitable bolts or the like, of the device to a part of a vehicle body or the chassis thereof. Access may be had to the interior of the casing and contained parts, through an opening normally closed by a cover 36 held in place by screws 37, a suitable packing 38 being used, to make the device fluid tight.

A spring 39 may be interposed between the cover plate 36 and the inner end of shaft 26, to seat and maintain seated a shoulder 26ᶜ formed on the shaft 26, against and in abutment with a shoulder 27ᵈ of the casings as clearly shown in Fig. 3 of the drawings. This forms a seal against leakage of the fluid in the bearings 26ª.

As the vehicle body and the axle move either toward or from each other, arm 30 will be caused to move through a given angle, and thus cause an angular movement of the arm 25 which is in constant engagement with the inner ends of the pistons 4 and 5. Such movement of arm 25 and its rounded part or end 24 will impart a movement of the pistons in one or another direction of movement or reciprocation depending upon the direction of swing of the arm 25, and also depending upon whether the vehicle body is moved upwardly or downwardly due to a bump or hole in the road.

The outer ends of cylinders 2 and 3 are connected together by means of a duct or passage 40. If no valve be located in this passage, the passage would permit the fluid, such as oil, which fills the cylinders and the passage, to pass back and forth through the passage 40 from one to the other of the cylinders 2 and 3 as the pistons 4 and 5 are reciprocated therein, and the vehicle body would move with relation to the axle with the accompanying resistance of the oil passing in the passage 40.

For the purpose of controlling and determining the resistance of the oil passage in the duct 40, a composite valve V (Figs. 2 to 10 inclusive) is mounted in the duct 40, preferably at a mid-point thereof. Illustrative embodiments of such a valve are shown in Figures 4, 5, 6, 8, 9 and 10 of the drawings, Fig. 10 showing a preferred embodiment or form.

Referring generally to the embodiments shown in Figs. 4, 5, 6, 8, 9, and 10, the valve comprises a valve casing 1ª provided with a transverse bore 41, which may be of cylindrical form if desired, or of non-circular form, such as oval or elliptical. Within the bore is tightly press-fitted a valve plug or block 42 having a cross duct 43 in registry with the passage or duct 40 of the casing 1 on both sides of the block 42. At an intermediate point of the duct 43 is provided a needle valve recess 44, the walls of which form a seat for a needle valve 45. The latter has a threaded shank 46 adjustably engaging internal threads of a recess 47 formed in one end of the block or plug 42. By rotating the shank 46, the needle valve 45 may be adjusted to and from its seat 44 to accordingly vary the capacity of cross-duct 43. The casing 1ª has an extension 48 for housing the shank 46, this extension being internally threaded to receive a closure cap 49 coacting with a packing 50 for rendering the device fluid tight. The casing 1ª also has an opposite extension 51 for housing the other end of the valve block structure, such extension 51 being internally threaded to receive a closure cap 52 coacting with suitable packing means which may comprise a metal plate 53 and a pair of non-metal gaskets 54 and 55. All of the above description is common to the forms shown in Figs. 4, 5, 6, 8, 9 and 10 of the drawings.

Referring now more particularly to the valve of Fig. 4, an end portion of the valve block 42 is provided with ducts 56 and 57 extending laterally from the segments of cross duct 43 on opposite sides of the needle valve means 44—45, and terminating in an end face 58 of the block 42. In contact with said end face 58 is a relief block 62 having ducts 63 and 64 respectively in registry with ducts 56 and 57, as clearly shown in Fig. 4 of the drawings. The outer ends of ducts 63 and 64 communicate with each other by a cross duct 65. A plate 66 is fitted against the outer end face of the block 62 to form an end wall for said block. This plate is held rigidly in place by a crimped over or spun flange 67. Between the plate 66 and the cap 52, reacts a helical spring 68 which normally holds the blocks 62 and 42 in close contact but yielding under excess pressure to permit said blocks to separate and relieve any such excess pressure. The duct 63 has an enlarged portion 69 in which plays a ball valve 70 adapted to seat on a seat formed between enlargement 69 and duct 63, to close against flow of fluid from duct 65 to duct 56, but to open to permit ready flow of fluid from duct 56 to duct 65.

This valve is especially designed to prevent any hissing. Varying the ducts in diameter to effect the desired resistance to fluid flow when the valve opens, does not, in itself, prevent hissing. This invention comprehends the providing of a given amount of throttling around the ball valve. It was found that by determining an annular orifice between the ball and the passage wall, where the ball played, for any particular given resistance to fluid passage, rather than by varying the size of the ducts, hissing was entirely eliminated. The inlet, such as duct part 63 is large compared to the cross-sectional area or effective area of the annular orifice. The throttling is effected in said orifice, or around the ball, instead of through a smaller entry passage to the ball chamber. When it is desired to change the resistance to fluid flow, a larger or smaller ball is used. To give an illustration, when it is desired to have resistances to flow in the two directions proportionate to factors 80 and 20, it has been found that a ball having a diameter of .125″ operating in a chamber of a diameter .133″, will answer to such resistance factor ratios. On the other hand, if the resistance factor ratios be 60 and 40, a ball of .128″ diameter in the same chamber will be proper. The resistance factors are explained below.

In ducts 57 and 64, is located a positioning element 71 which may be flat as shown. This element 71 is useful in assembling the parts such that by its passing through these ducts 57 and 64, said parts are held in registry and when the parts are inserted in the bore 41, the ducts 56 and 63 are brought automatically in registry and are held so.

In operation, the needle valve is adjusted so as to permit a given capacity of flow through the cross duct 43 in either direction of flow of the fluid in the duct 40. If it be assumed that the highest practical resistance to flow be represented by a factor 100 or 100% resistance, than by adjusting the needle valve, that resistance to flow (through the needle valve) may be reduced to smaller factors, such as 90, 80, 70, 60, etc. If the flow be in the direction of when the ball valve is closed, than when a valve is set for an 80 factor resistance, the transfer of fluid will be effected with 80% the force required at maximum resistance represented by the factor 100 or 100%. Now in the opposite flow, when the ball valve is open, the throttling may be chosen so that the transfer of fluid may be effected with 20% the force required at maximum resistance, the velocity of piston travel being the same in both directions. Thus the factor would be 20 and the factor ratios for such flows are referred to as an 80-20 ratio. Likewise, the needle valve adjustment and the throttling orifice may be adjusted so that the factor ratios may be as desired, as for example, 60-40, 80-53, 100-25, 100-67, 50-50, etc. When the vehicle body moves toward the axle, it is sometimes desired that such movement be more or less free or have a low resistance to free movement, such as by a resistance factor of 20 as above indicated. Then, when the vehicle body moves upwardly and away from the axle, the movement may be slower or more greatly resisted, such as by the resistance factor 80. Assuming that the valve of Fig. 4 be so set, that is to effect resistances to flow or transfer of the fluid in accordance with the factors 20 and 80, flow in one direction of movement must be wholly through the duct 40. Such would be the case when the flow is upward, as viewed in Fig. 4, since the ball valve 70 is closed and all flow of fluid must be through the cross duct 43 and the needle valve means 44—45. In this case the resistance is represented by the factor 80. Now, if the flow be in the opposite direction, part will flow through the needle valve means and part will by-pass through ducts 56, 63, 65, 64, and 57, the ball valve 70 opening for that purpose. The resistance here would be represented by the factor 20. The needle valve may be adjusted so that other relations of resistances represented by different factors may be used.

Should, for any reason, an excessive pressure be effected in the system, such pressure would be relieved by the block 62 moving away from the end of block 42 and the fluid by-passing in the space therebetween, and ducts 56 and 57, the spring 68 being compressed by the movement of block 62. This spring is of such a strength as not to yield except under pressures in excess of that effective at the greatest resistance factor usable in the device. After the excessive pressure has been relieved, the spring 68 will return the parts to normally closed or contacting positions, as shown in Fig. 4.

The device of Fig. 5, may be one for equal resistances in both directions of flow, such as, for examples, with factors of 40—40, 50—50, 60—60, 75—75, etc. The block portion 72 has ducts 73 and 74 extending to the end of the valve block and normally closed by a plate 75 held by a spring 76 reacting against cap 52. The resistances to flow are equal in both directions. Excessive pressure will be relieved by moving of the plate 75 from the end of the block 72 and permitting of the by-passing in the space between such plate and the end of the block from one to other of ducts 73 and 74.

The device of Fig. 6 is somewhat similar to that of Fig. 4, but omits the excess pressure relieve means. The block portion 77 has by-pass ducts 78 and 79 and a cross duct 80, the duct 79 having a ball valve 81 adapted to open to permit given throttled flow from duct 79 to ducts 80 and 78, but to close to prevent flow from ducts 78 and 80 to duct 79 and adjacent part of cross duct 43. The end of block portion 77 has a plate 82 rigidly held in place by a crimpled over or spun flange 83, as shown in Fig. 6. The structure is otherwise like that shown in Fig. 4 and operates similarly.

Fig. 8 shows an alternate form with an elongated block portion 91 having a long duct 92, a short duct 93 and a cross duct 94, the latter having a ball valve 95 adapted to permit given throttled flow from duct 92 through duct 94 to duct 93 but checking flow from duct 93 through duct 94 to duct 92. Behind ball 95 is a stop pin 96 press fitted into place for limiting the movement of the ball 95 From the enlarged part of duct 94 leads a duct 97 having a ball valve 98 normally pressed to its seat by a spring 99 reacting against a plate 100 secured in the end of block portion 91 and held in place by a crimped-over or spun flange 101. A cross duct 102 connects the outer end of duct 92 with the enlarged portion of duct 97 to act as a relief by-pass.

When excessive pressure exists in the device on the checking side of the ball valve 95, then ball valve 98 will open and the fluid will be by-passed by way of ducts 97, 102 and 91 in the order mentioned. In the reverse direction by-passing is by way of ducts 91, 94 and 93 in the order mentioned, the ball valve 95 opening for the purpose. This valve as shown, may be of the order of 80—20 factor resistances. The safety relief is on the high pressure side.

Fig. 9 shows a device similar to that of Fig. 8. The block portion 103 has ducts 104 and 105 and a cross duct 106 in which a ball valve 107 operates to check flow from duct 105 to ducts 106 and 104 but which will open to permit flow from duct 104 to ducts 106 and 105. The movement of the ball valve 107 may be controlled by a pin 108 mounted in the duct 106 and behind the ball valve 107. The ducts 104 and 105 continue to the end of the block portion 103 and into recesses 109 and 110 normally closed by plate means comprising a metal plate 111 and a non-metallic disc or gasket 112, the plate means being held in closed position by a spring 113 reacting against cap 52.

When excessive pressure occurs in the device, it will move the plates 111 and 112 from the end of the block portion 103 and provide a relief by-pass from one to the other of the ducts 104 and 105. The spring will return the plate means to closing position after the excess pressure has been relieved.

Fig. 10 shows a device somewhat similar to those of Figs. 8 and 9. Its block portion 114 has longitudinal ducts 115 and 116 and a cross duct 117 connecting ducts 115 and 116, the cross duct 117 having a ball valve 118 for checking flow from duct 116 to ducts 117 and 115 but permitting flow from duct 115 to ducts 117 and 116. The movement of the ball valve 118 may be controlled by a stop pin 119 located in the enlarged part of duct 117 and behind the ball valve 118. The ducts 115 and 116 lead to the end of the block portion 114, the duct 116 having an enlarged portion and a large ball valve 120 therein. This ball is designed with respect to the ball chamber walls, to form a throttling orifice to prevent hissing for the same reasons explained above in connection with the throttling orifice in the device shown in Fig. 4. This ball is of a size to project beyond the end face of the block portion 114. Normally the ball valve is held to its seat or closed position by a plate 121 pressed by a spring 122 reacting against cap 52. Where there is excessive pressure in the device, it is relieved by the opening of the valve 120, to permit the fluid to by-pass between the end of the block 114 and plate 121 from one to the other of the ducts 115 and 116. After such relieving of such pressure, the spring 122 acts to return the valve 120 to its seat, the plate 121 pressing against the ball for that purpose. In this form, if desired, the needle valve 45ª may have an annular groove 123 to decrease the maximum resistance of flow through the needle valve device, this being in addition to the opening of the valve longitudinally or axially thereof.

In all forms of valves shown, the ball valves and their chamber walls form throttling orifices for preventing hissing, as in the case explained above in connection with the valve shown in Fig. 4.

While I have herein described and upon the drawings shown various embodiments of the invention, it is to be understood that the invention is not limited thereto, but may comprehend other constructions, arrangements of parts, details and features without departing from the spirit thereof.

Having thus disclosed the invention, I claim:

1. In a shock absorber having a cylinder and a piston therein and a fluid duct communicating with the ends of the cylinder, a control device in said duct, and comprising means for adjusting the capacity of flow of fluid in said duct and means for by-passing fluid in both directions constantly restricted in one, and variably restricted in the other direction.

2. In a shock absorber having a cylinder and a piston therein and a fluid duct providing the only direct communication between the ends of the cylinder, a control device in said duct and comprising means for adjusting the capacity of flow of fluid directly through said duct, by-pass means for by-passing fluid in a direction of flow thereof, and relief means in the by-pass for relieving excessive pressure in said duct.

3. A shock absorber comprising a housing for holding a fluid supply, means in the housing for causing movement of the fluid in one or another direction of movement, a duct in the housing and adapted directly to transfer the fluid from one into another part of the housing, means provided in said duct to permit a constantly restricted flow of the fluid in both directions and additional, variably restricted flows of the fluid in the one direction in said duct.

4. A shock absorber comprising a housing for holding a fluid supply, means in the housing for causing movement of the fluid in one or another direction of movement, a duct in the housing and adapted to transfer the fluid from one to another part of the housing, metering means associated with said duct for determining the maximum resistance to transfer of the fluid therethrough, means associated with said duct to permit a rapid transfer of the fluid in a direction of movement in said duct, and means for throttling the rate of transfer of the fluid in said direction.

5. A shock absorber comprising a housing for holding a fluid supply, means in the housing forming compression chambers therein, and for causing movement of the fluid in one or another direction between said chambers, a duct associated with the housing and adapted to transfer the fluid directly from one to another compression chamber in the housing, means associated with said duct for determining the maximum resistance to transfer of the fluid therethrough, means associated with said duct to permit a rapid transfer of the fluid in a direction of movement in said duct, means for throttling the rate of transfer of the fluid in said direction, and relief means associated with the duct for relieving excess pressure in said duct.

6. A shock absorber comprising a housing for holding a fluid supply, fluid displacement means in the housing forming two compression chambers therein, a duct in the housing and adapted to transfer the fluid directly between the compression chambers, a valve in said duct for controlling the normal transfer of fluid therein in both directions, and means for by-passing fluid around said valve in only one direction of flow thereof.

7. A shock absorber comprising a housing for holding a fluid supply, means in the housing for causing movement of the fluid in one or another direction of movement, a duct in the housing and adapted to transfer the fluid from one to another part of the housing, means associated with said duct to permit a slow transfer of the fluid in one direction and a rapid transfer of the fluid in an opposite direction of movement in said transfer means and including means for by-passing fluid in a direction of flow thereof.

8. A shock absorber comprising a housing for holding a fluid supply, means in the housing for causing movement of the fluid in one or another direction of movement, a duct in the housing and adapted to transfer the fluid from one to another part of the housing, means associated with said transfer means to permit a slow transfer of the fluid in one direction and a rapid transfer of the fluid in an opposite direction of movement in said duct, and means for adjusting the relative rates of transfer of the fluid in opposite directions, said associated means including means for by-passing fluid in a direction of flow thereof.

9. A shock absorber comprising a housing for holding a fluid supply, means in the housing for causing movement of the fluid in one or another direction of movement, a duct in the housing and adapted to transfer the fluid from one to another part of the housing, means associated with said transfer means to permit a slow transfer of the fluid in one direction and a rapid transfer of the fluid in an opposite direction of movement in said duct, and means for adjusting the relative rates of transfer of the fluid in opposite directions, said associated means including means for by-passing fluid in a direction of flow thereof, and said adjusting means including throttling means in said by-passing means.

10. A shock absorber comprising a housing for holding a fluid supply, means in the housing for causing movement of the fluid in one or another direction of movement, a duct in the housing and adapted to transfer the fluid from one to another part of the housing, means associated with said duct to permit a slow transfer of the fluid in one direction and a rapid transfer of the fluid in an opposite direction of movement in said duct, means for adjusting the relative rates of transfer of the fluid in opposite directions, said associated means including means for by-passing fluid in a direction of flow thereof, and relief means associated with said duct for relieving excess pressure in said transfer means.

11. A shock absorber comprising a housing for holding a fluid supply, means in the housing for causing movement of the fluid in one or another direction of movement, a duct in the housing and adapted to transfer the fluid from one to another part of the housing, means associated with said duct to permit a slow transfer of the fluid in one direction and a rapid transfer of the fluid in an opposite direction of movement in said duct, means for adjusting the relative rates of transfer of the fluid in opposite directions, said associated means including means for by-passing fluid in a direction of flow thereof, and throttling means in said by-passing means and relief means associated with the duct for relieving excess pressure in said transfer means.

12. A shock absorber comprising a housing for holding a fluid supply, means in the housing for causing alternate movements of the fluid, a duct in the housing and having means for controlling the rate of transfer, said housing having spaced and alined bearings therein, said housing having a key-hole shaped opening opposite one of said bearings said opening comprising a circular hole and a communicating slot, said first mentioned means having a shaft in said bearings and having an intermediate part of said shaft extending from between said bearings, the bearing adjacent said opening forming the circular hole thereof and having a passage forming the slot for the passage of said extending part when said shaft is inserted in said bearings.

13. A shock absorber comprising, in combination, a housing providing a cylinder adapted to contain a fluid; a piston in said cylinder forming two compression chambers therein; a duct connecting the two chambers; and fluid flow control devices for said duct, comprising, means extending into the duct constantly to restrict the flow of fluid in both directions through the duct, means adapted to establish a second, constantly restricted flow of fluid through said duct in one direction only, and spring loaded means adapted to establish a variably restricted flow of fluid through said duct in the opposite direction to said second constantly restricted flow.

14. In a shock absorber the combination with a cylinder, a piston in said cylinder forming two compression chambers therein, a fluid duct providing direct communication between said chambers, a fluid flow control device in said duct comprising means for adjusting the capacity of the flow of fluid through said duct in either direction, and a by-pass duct communicating with the aforesaid duct and leading around said fluid flow control device, and means in said by-pass duct for establishing a flow of fluid through said by-pass duct in one direction only.

15. In a shock absorber the combination with a cylinder, a piston in said cylinder forming two compression chambers therein, a fluid duct providing direct communication between said chambers, a fluid flow control device within said duct and comprising an adjustable valve, a duct having both ends in communication with said aforementioned duct for by-passing fluid around said fluid flow control device, means within said by-pass duct for providing a constantly restricted flow of fluid in one direction only through said by-pass duct.

16. A shock absorber comprising, in combination, a casing providing a cylinder, a piston in said cylinder forming two compression chambers therein, a duct in the casing providing for the transfer of fluid between said chambers in either direction, an intermediate duct both ends of which communicate with the aforementioned duct, means in the first mentioned duct for establishing a constantly restricted flow of fluid in either direction through said duct in response to movements of the piston in either direction, and means in the intermediate duct for providing a constantly destricted flow of fluid through said intermediate duct in one direction only and closing said intermediate duct against fluid flow in response to the movements of the piston in the opposite direction.

In witness whereof, I hereunto subscribe my name to this specification.

JAY C. PARSONS.